United States Patent [19]
Amzajerdian

[11] Patent Number: 4,995,720
[45] Date of Patent: Feb. 26, 1991

[54] PULSED COHERENT DOPPLER LASER RADAR

[75] Inventor: Farzin Amzajerdian, Newbury Park, Calif.

[73] Assignee: Litton Systems, Inc., Woodland Hills, Calif.

[21] Appl. No.: 449,975

[22] Filed: Dec. 12, 1989

[51] Int. Cl.$^5$ .................... G01C 3/08; G01P 3/36
[52] U.S. Cl. ........................ 356/5; 356/28.5
[58] Field of Search .................. 356/5, 28.5

[56] References Cited

U.S. PATENT DOCUMENTS

| 3,431,504 | 3/1969 | Adler | 329/129 |
|---|---|---|---|
| 3,506,835 | 4/1970 | Foster | 250/199 |
| 3,856,402 | 12/1974 | Low | 356/5 |
| 3,937,575 | 2/1976 | Bateman | 356/5 |
| 4,186,344 | 1/1980 | Higuchi | 325/20 |
| 4,298,280 | 11/1981 | Harney | 356/5 |
| 4,447,149 | 5/1984 | Marcus | 356/5 |
| 4,505,582 | 3/1985 | Zuleeg et al. | 356/5 |
| 4,516,853 | 5/1985 | Pearson | 356/152 |
| 4,690,551 | 9/1989 | Edwards | 356/5 |
| 4,822,164 | 4/1989 | Breen | 356/28.5 |

OTHER PUBLICATIONS

I. Goldstein and A. Chabot, Characteristics of a Traveling-Wave Ruby Single-Mode Laser as a Laser Radar Transmitter, 9/9/66, pp. 519-523, IEEE Journal of Quantum Electronics, vol. QE-2, No. 9.

Primary Examiner—Stephen C. Buczinski
Attorney, Agent, or Firm—Poms, Smith, Lande & Rose

[57] ABSTRACT

In a pulsed coherent Doppler radar, a Q-switched laser source develops a laser beam to have a high intensity pulse portion and a substantially lower intensity trailing tail portion. A switching device upon which the laser beam is incident directs substantially all of the energy of the pulse portion along a first propagation path towards a target, such as atmospheric aerosols, and substantially all of the energy of the tail portion along the second propagation path. The target reflects the pulse portion as a received signal. A heterodyne detector upon which each of the received signal and the tail portion is incident, determines the Doppler shift of the received signal with respect to the tail portion. The detector uses the tail portion as the local oscillator. The acousto-optic modulator also upshifts the frequency of the tail portion.

12 Claims, 2 Drawing Sheets

PULSED COHERENT DOPPLER LASER RADAR

FIELD OF THE INVENTION

The present invention relates generally to laser radar systems and, more particularly, to a pulsed coherent Doppler laser radar for remote wind sensing.

BACKGROUND OF THE INVENTION

Many techniques and systems have been utilized to measure atmospheric or clear air turbulence. Generally, from analyzing a model of the atmosphere, some variable or state of the atmosphere that is affected by the turbulence is detected. Known prior art systems include passive and active acoustics, optical stellar scintillation detection, microwave scintillation of radio, star and satellite beacons, infrared and microwave backscatter, tropospheric bistatic radio scatter, and ultra sensitive radar.

A number of difficulties have arisen in utilizing one or more of the foregoing techniques or systems for airborne applications. For example, excessively large antennas are required if microwave techniques are to be employed and difficulties in achieving adequate range and accuracy of velocity information arise with those techniques which rely on the optical stellar scintillation system mentioned hereinabove. Accordingly, pulsed laser radar apparatus have been developed for the measurement of air turbulence suitable for use in an aircraft and capable of providing highly accurate measurements at a substantial range.

For example, in U.S. Pat. No. 3,856,402, a pulsed laser Doppler radar system is described. As described in the '402 patent, a train of short pulses of radiation, generated by a laser source, typically a $CO_2$ laser, is developed with the direction of propagation of the pulse being in the direction of flight of the aircraft. The laser pulses are backscattered from the atmospheric aerosol. An optical receiver is arranged to detect the backscattered return. The radiation backscattered by atmospheric particulates is fed to an optical receiver in the aircraft and is Doppler shifted by an amount $f_D$ where $f_D$ equals $2V/\lambda$. V is the velocity component along the direction of the pulse propagation between the aircraft and the air in the instantaneously illuminated volume of air and $\lambda$ is the wavelength of the laser. The length of the propagated pulse determines the spatial resolution in the atmosphere and also the Doppler shift resolution. The turbulence detection capability of the system is a consequence of the simultaneous measurement of Doppler shift from different regions of the instantaneous pulse volume in the atmosphere whence the turbulence in the air is inferred from the bandwidth of the backscattered signal. The distance to the turbulence is inferred from the roundtrip propagation time.

Precise frequency measurement capability is achieved by beating the scattered radiation with a continuous wave, highly stable laser beam, a process which results in a beat frequency directly proportional to the velocity component. The pulsed laser source is derived from a stable, continuous wave laser source by pulse modulating the output of the laser. This technique assures the presence of a reference beam for the homodyne frequency conversion process employed.

A disadvantage and limitation of the system described in the '402 patent is that a master oscillator laser is used to generate each of the local oscillator beam and the high energy pulses for transmission using a laser amplifier. Such a system suffers from insufficient isolation between the transmitter and local oscillator beams. To achieve the necessary isolation, an elaborate system as described in the '402 patent is required. Another disadvantage and limitation of such a system as described in the '402 patent is that the high gain laser amplifier used to generate the high energy transmitter pulses is highly alignment sensitive and are easily affected by environmental parameters such as vibration and temperature variation.

Other known prior art coherent Doppler laser radars use a highly stable low power continuous wave laser as in injection oscillator. The injection oscillator provides the means for frequency locking of the pulsed high power transmitter laser and the moderate power continuous wave local oscillator laser. A disadvantage and limitation of a system that uses an injection oscillator laser in addition to a local oscillator and transmitter lasers is that such systems are not suitable for many applications because of their complexity and size.

It is therefore highly desirable to use a single pulsed laser source for both the transmission and local oscillator in a laser radar system. A system of this type is described in U.S. Pat. No. 4,447,149. The apparatus described in the '149 patent utilizes a single Q-switched laser to generate both the target signal and a local oscillator signal for use in a heterodyne signal detector. After the laser pulse is generated, the laser unit is maintained at a very low signal output level for substantially the majority of time before the generation of the next laser pulse. This is achieved by designing the Q-switch transmission as a function of time in accordance with the lasing media, resonator parameters and the required pulse shape. During the time the laser is operated a very low signal output level, the output of the laser is utilized as a local oscillator and is mixed with the returning target signal prior to application to the detector unit.

A disadvantage and limitation of the radar apparatus disclosed in the '149 patent is that the laser beam including both the high intensity pulse and trailing tail is incident on a beam splitter so that a portion of the entire optical energy is directed to the target and another portion of the total optical energy of each of the high intensity pulse and trailing tail is used as the local oscillator. However, in optical heterodyne detection, it is desired to use a local oscillator with a large enough optical power to allow for the detector quantum noise limited operation. In the system described in '149, it is not practical to provide sufficient amount of local oscillator power without damaging the detector by the high intensity portion of the pulse. Separating the high intensity portion of the beam from the trailing tail eliminates this problem. In addition, due to the loss of energy in the high intensity pulse delivered to the target, the range of the laser radar apparatus is accordingly limited.

SUMMARY OF THE INVENTION

Accordingly, it is an object of the present invention to overcome one or more of the disadvantages and limitations of the prior art enumerated hereinabove. It is a further object of the present invention to provide a pulsed laser radar apparatus which using a single laser source for both local oscillator and transmission achieves optimum heterodyne detection without damaging the detector and any significant attenuation of the high intensity pulse directed to the target. Another object of the present invention is the elimination of the elaborate isolation devices between the transmitter and local oscillator sources and the relaxation of some of the system environmental requirements such as vibration and temperature variations. It is yet another object of the present invention to provide such a system that is compact and suitable for the most practical applications, particularly for short range avionics.

According to the present invention, a source of propagating coherent wave energy develops the energy to have a high intensity pulse portion and a substantially lower intensity trailing tail portion. A switching device upon which the energy is incident directs substantially all of the energy of the pulse portion along a first propagation path towards the target and most of the energy of the tail portion along the second propagation path. The target reflects the pulse portion as an echo pulse. A detector upon which each of the echo pulse and the tail portion is incident, determines the Doppler shift of the echo pulse with respect to the tail portion.

In one specific embodiment of the present invention, the source of propagating coherent wave energy is a Q-switched pulsed laser source. The laser source resonator, pulse forming network, and Q-switch are designed accordingly to generate a single frequency pulse with the desirable temporal profile. The switching device is an acousto-optic modulator illuminated by the laser beam developed by the Q-switched laser pulse. The modulator is off during the high intensity pulse portion to transmit the high intensity pulse along the first propagation path. The modulator is then turned on to refract the tail portion along the second propagation path. The detector being a heterodyne detector then uses the tail portion as the local oscillator.

A significant advantage is the use of the acoustooptic modulator to switch the single laser source so that it may be used for both the local oscillator and transmission of the high intensity pulse without any significant attenuation while achieving optimum heterodyne detection. Another advantage is that it eliminates the need for an elaborate isolation device. Such a system is compact and simple and suitable for most practical applications, particularly for short-range avionic applications. These and other advantages, objects and features of the present invention become apparent to those skilled in the art from a study of the following description of an exemplary preferred embodiment when read in conjunction with the attached drawings and dependent claims.

DESCRIPTION OF AN EXEMPLARY PREFERRED EMBODIMENT

Figure 1:
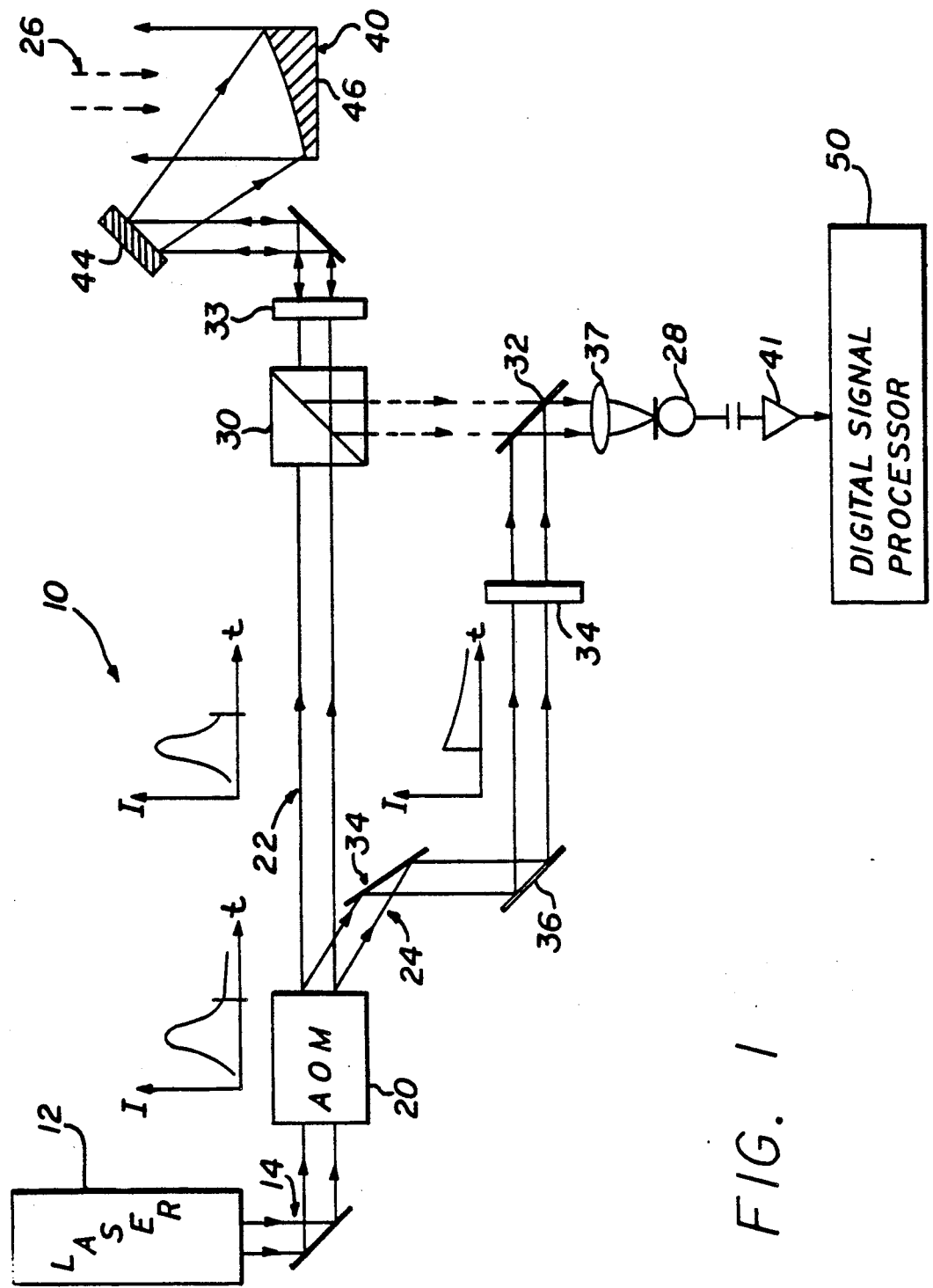
FIG. 1 is a schematic block diagram of a pulsed laser apparatus utilizing a single laser source in accordance with the principles of the present invention.
Figure 2A:
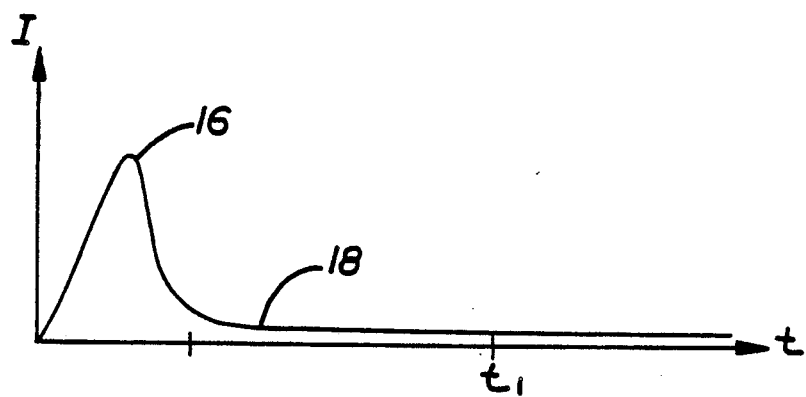
FIGS. 2A-2C are graphic representations of the laser output wave form showing the high intensity pulse and trailing tail portion as used by the system of FIG. 1.
Figure 2B:
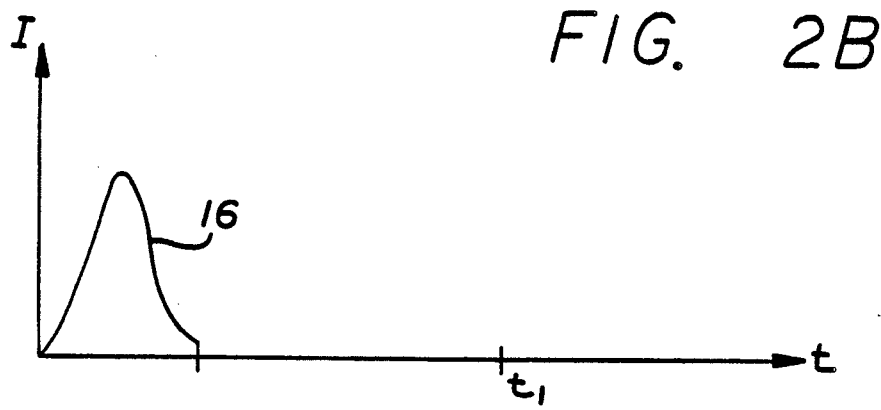
Figure 2C:
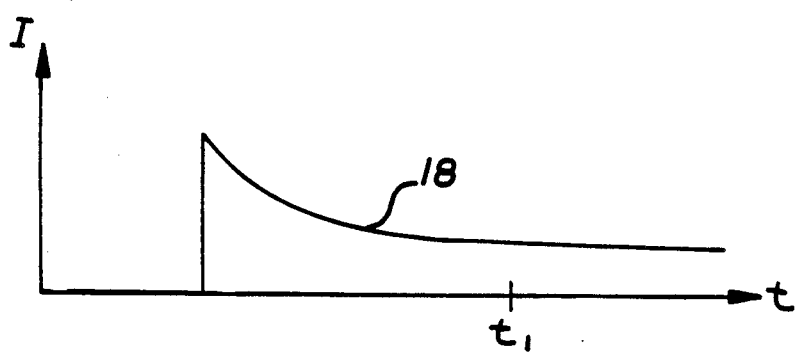

Referring now to FIGS. 1 and 2, there is shown a pulsed coherent Doppler laser radar system 10. The radar system 10 includes a single pulsed laser source 12. The laser source 12 is a Q-switched pulsed laser source which develops a laser beam 14 having a high intensity pulse portion 16 and a substantially lower intensity trailing tail portion 18, as best seen in FIG. 2A. The laser source 12 generates a single frequency pulse that is stable over the round trip time of the laser pulse to the target.

The laser beam 14 illuminates an acousto-optic modulator 20. The acousto-optic modulator 20 acts as a switching device to direct substantially all of the energy of the pulse portion 16 along a first propagation path 22 and to direct substantially all of the energy of the tail portion 18 along a second propagation path 24. As is well known in the art, the acousto-optic modulator 20 operates on the Bragg diffraction principle. The switching of the acousto-optic modulator 20 is synchronized with the firing of the laser Q-switch within the laser source 12. The timing of the switching of the acousto-optic modulator 20 may be inferred from FIGS. 2A-2C.

More specifically, the acousto-optic modulator 20 is off during transmission of the high intensity pulse portion 16 and then is turned on during the trailing tail portion 18. The acousto-optic modulator 20 remains on for the duration of the laser beam 14 during the trailing tail portion 18 before being turned off for the next occurrence of the high intensity pulse portion 16. When the acousto-optic modulator 20 is off, the high intensity pulse portion 16 passes therethrough without significant attenuation. However, when on, the tail portion 18 is attenuated.

Some of the energy of the pulse portion 16 is backscattered by a target and returned along the first optical path 22 as a received signal 26. A heterodyne detector 28 is illuminated by both the tail portion 18 and the received signal 26. The heterodyne detector 28 utilizes the tail portion 18 as the local oscillator to determine the Doppler shift of the received signal 26 with respect to the tail portion 18. The target may be aerosols within the atmosphere. By measuring the relative velocity of these aerosols with respect to the first propagation path 22, clear air turbulence may be detected.

The acousto-optic modulator 20, in addition to functioning as an optical switching device, also upshifts the frequency of the trailing tail portion 18. The local oscillator shift of frequency is necessary in stationary systems for heterodyne detection and in airborne systems to compensate for the large Doppler frequency shift due to the aircraft motion.

Completing the description of the radar system 10, a polarizing beam splitter 30 is disposed in the first optical path 22. The beam splitter 30 passes the high intensity pulse portion 16 towards the target and diffracts the received signal 26 towards the heterodyne detector 28, as further explained below. Polarizing beam splitter 30 passes essentially the entire vertically polarized laser pulse portion 16. The high intensity pulse portion 16 is then circularly polarized by quarter-wave plate 33 and directed by mirror 35 through transmitter/receiver telescope 40. The received signal 26 is collected by telescope 40 and directed through quarter-wave plate 33. The polarization of the received signal 26 is then converted from circular to horizontal which reflects off the polarizing beam splitter 30. The received signal 26 is directed by polarizing beam splitter 30 through beam splitter 32 to be focused by a lens 37 on the detector 28.

To direct the tail portion 18 to the heterodyne detector 28, a first mirror 34 is disposed in the second optical path 22. The reflected tail portion 18 from the first mirror 34 is then incident on a second mirror 36. The second mirror 36 directs the tail portion 18 toward the half-wave plate 39 in order to change its polarization from vertical to horizontal to match the polarization of the received signal 26. The beam splitter 32 then combines the tail portion 18 with the received signal 26 by diverting some of its energy into the path of received signal 26. The lens 37 focuses both the received signal 26 and part of the tail portion 18 onto the heterodyne detector 28. The output of the heterodyne detector 28 is amplified by amplifier 41 to be digitized and processed by digital signal processor 50. The output signal of heterodyne detector 28 has a frequency equal to the doppler shifts between the transmitted and received radiations offset by the frequency of acousto-optic modulator 20.

To increase the range of the radar system 10, subsequent to the first beam splitter 30 along the first optical path 22, the telescope 40 is provided intermediate the first beam splitter 30 and the target. The telescope 40 is an off-axis Dall Kirkham comprising of a convex spherical mirror 44 and an elliptical mirror 46.

The radar system 10 as hereinabove described is particularly useful for sensing atmospheric winds. As discussed hereinabove, the aerosols scatter the high intensity pulse portion 16 and return its reflection as the received signal 26. The transmitted pulse width of the high intensity portion 16 is then chosen to be about the same as the correlation time associated with atmospheric aerosol backscatter which is related to the operating wavelength. Operating at 2.1 micron wavelength, the atmospheric correlation time is about 200 nanoseconds. A 200 nanoseconds pulse width allows for a reasonable sampling period and corresponds to a path resolution of 60 meters. The total laser pulse width, including the tail portion 18, is equal to or longer than the round trip time of the transmitted high intensity pulse portion 16.

Multiple ranging can then be accomplished by using the firing time of the laser source 12 as a reference in the processing by a digital signal processor 50. Receiving and processing of the received signal 26 from atmospheric aerosols are then performed in temporal windows equal in width to that of the transmitted pulse 16. Several windows can be used to receive and process the return signal corresponding to different ranges.

There has been described hereinabove a novel pulse coherent Doppler laser radar system for remote wind sensing. Those skilled in the art may now make numerous uses of and departures from the hereinabove described exemplary preferred embodiment without departing from the inventive principles disclosed herein. Accordingly, the present invention is to be defined solely by the scope of the following claims.

What is claimed is:

1. A laser radar apparatus comprising:
   a source of propagating coherent wave energy, said energy having a high intensity pulse portion and a substantially lower intensity trailing tail portion;
   a switching device upon which said energy is incident wherein substantially all of said pulse portion is directed along a first propagation path toward a target and substantially all of the energy of said tail portion is directed along a second propagation path, said target reflecting said pulse portion as a received signal; and
   a detector upon which each of said received signal and said tail portion is incident to determine the Doppler shift of said received signal with respect to said tail portion.

2. A laser radar apparatus as set forth in claim 1 wherein said source is a Q-switched pulsed laser source generating a single frequency pulse that is stable over duration of the pulse.

3. A laser radar apparatus as set forth in claim 1 wherein said switching device is an acousto-optic modulator, said energy being laser energy.

4. A laser radar apparatus as set forth in claim 1 wherein said detector is a heterodyne detector.

5. A pulsed coherent Doppler laser radar comprising:
   a Q-switched pulsed laser source to develop a laser beam having a high intensity pulse portion and a substantially lower intensity trailing tail portion;
   an acousto-optic modulator illuminated by said laser beam, said modulator being switched to transmit said pulse portion along a first propagation path toward a target and said tail portion along the second propagation path, said target reflecting said pulse portion as an received signal; and
   a heterodyne detector illuminated by each of said tail portion and said received signal, said detector utilizing said tail portion as a local oscillator.

6. A laser radar as set forth in claim 5 further comprising:
   a polarizing beam splitter disposed in said first optical path, said beam splitter passing said pulse portion toward said quarter-wave plate toward said target and diffracting said received signal returning along said first optical path toward said detector.

7. A laser radar set forth in claim 6 further comprising:
   a quarter-wave plate disposed intermediate said beam splitter and said target.

8. A laser radar set forth in claim 6 further comprising:
   a second beam splitter disposed to combine said tail portion and said received signal prior to illuminating said detector.

9. A laser radar set forth in claim 8 further comprising:
   a first mirror disposed on said second optical path; and
   a second mirror to direct said tail portion reflected from said first mirror to said second beam splitter.

10. A laser radar as set forth in claim 9 further comprising:
    a half-wave plate disposed intermediate said first mirror and said second beam splitter.

11. A laser radar as set forth in claim 6 further comprising:
    a telescope disposed along said first propagation path intermediate said first beam splitter and said target.

12. A laser radar as set forth in claim 5 wherein said acousto-optic modulator frequency upshifts said tail portion.

* * * * *